US006496353B1

(12) United States Patent
Chio

(10) Patent No.: US 6,496,353 B1
(45) Date of Patent: Dec. 17, 2002

(54) CAPACITIVE STRUCTURE FOR USE WITH COAXIAL TRANSMISSION CABLES

(75) Inventor: Vincent Chio, Mountain View, CA (US)

(73) Assignee: Anritsu Company, Morgan Hill, CA (US)

( * ) Notice: Subject to any disclaimer, the term of this patent is extended or adjusted under 35 U.S.C. 154(b) by 0 days.

(21) Appl. No.: 10/060,839

(22) Filed: Jan. 30, 2002

(51) Int. Cl.[7] .......................... H01G 4/228; H01G 4/38

(52) U.S. Cl. ............................... 361/306.1; 361/306.3; 361/328

(58) Field of Search ............................ 361/301.4, 302, 361/304, 306.1, 306.3, 328

(56) References Cited

U.S. PATENT DOCUMENTS 4,291,362 A * 9/1981 MacMillan et al. ........ 29/25.42
4,934,960 A * 6/1990 Capp et al. ................. 333/185

* cited by examiner

*Primary Examiner*—Anthony Dinkins
(74) *Attorney, Agent, or Firm*—Fliesler Dubb Meyer & Lovejoy LLP

(57) ABSTRACT

A capacitive structure includes two parallel plate capacitors configured for placing between coaxial cables. The first parallel plate capacitor includes an upper conductive plate and a lower conductive plate that are substantially parallel to one another and separated from one another by a first dielectric material. The second parallel plate capacitor includes an upper conductive plate and lower conductive plate that are substantially parallel to one another and separated by a second dielectric material. The lower conductive plate of the first capacitor is engaged against, and thereby connected to, the upper conductive plate of the second capacitor. A conductive clip connects the upper conductive plate of the first capacitor to the lower conductive plate of the second capacitor. A channel in the clip prevents the lower conductive plate of the first capacitor and the upper conductive plate of the second capacitor from shorting with the upper conductive plate of the first capacitor and the lower conductive plate of the second capacitor. To maintain the clip between the coaxial cables, axial pressure may be applied from an insert in the center conductor of at least one of the cables.

25 Claims, 9 Drawing Sheets

CAPACITIVE STRUCTURE FOR USE WITH COAXIAL TRANSMISSION CABLES

BACKGROUND OF THE INVENTION

1. Field of the Invention

The present invention relates capacitors, and more particularly a parallel plate capacitive structure for connecting to microwave coaxial transmission cables.

2. Description of the Related Art

FIG. 1A illustrates a microwave coaxial transmission cable 100 that has an inner conductor 102 and an outer conductor 106. FIG. 1B shows a cutaway side view of microwave coaxial transmission cable 100. Inner conductor 102 and outer conductor 106, which are parallel to one another, are separated from one another by an insulator 104 that surrounds inner conductor 102. An additional insulator 108 (also known as a shield) surrounds an outer surface of outer conductor 106. It is noted that the thickness of each of elements 102, 104, 106 and 108 of cable 100 are not necessarily drawn to scale in FIGS. 1A and 1B.

It is sometimes desirable to block low frequencies from being propagated through a microwave transmission line made up of one or more microwave coaxial cables 100. Capacitors are typically used to block low frequencies. However, the use of a capacitor in a coaxial environment presents challenges due to the size and structure of coaxial cables 100. Coaxial cables are typically connected to a substrate containing one or more capacitors, and a transition is made back from the substrate to another coaxial cable.

BRIEF SUMMARY OF THE INVENTION

In accordance with an embodiment of the present invention a capacitive structure is provided including first and second parallel plate capacitors. The first parallel plate capacitor includes an upper conductive plate and a lower conductive plate that are substantially parallel to one another and separated from one another by a first dielectric material. Similarly, the second parallel plate capacitor includes an upper conductive plate and lower conductive plate that are substantially parallel to one another and separated by a second dielectric material. The lower conductive plate of the first capacitor is engaged against, and thereby connected to, the upper conductive plate of the second capacitor. A conductive clip connects the upper conductive plate of the first capacitor to the lower conductive plate of the second capacitor.

The conductive clip includes a body having an outer surface and an inner surface, and the clip body is substantially rectangular. The inner surface includes a channel to prevent the lower conductive plate of the first capacitor and the upper conductive plate of the second capacitor from shorting with the upper conductive plate of the first capacitor or the lower conductive plate of the second capacitor. The channel extends a width of the body of the conductive clip. A height of the channel is preferably greater than a combined height of the lower conductive plate of the first capacitor and the upper conductive plate of the second capacitor to prevent contact with these plates, which would result in shorting.

Extending from opposite ends of the inner surface are a first lip and a second lip, which form a cavity for accepting the first and second capacitors. When the capacitors are within the cavity, the first lip engages against an outer surface of the upper conductive plate of the first capacitor, and the second lip engages against an outer surface of the lower conductive plate of the second capacitor.

Electrical contact is made between the clip and a first coaxial cable to enable a signal to be transmitted through the capacitors. The outer surface of the conductive clip body includes a first bore to receive a first inner conductor of a first coaxial cable to make the contact. The bore extends into, but preferably not through, the body.

To make contact with a second coaxial cable, a conductive cup is connected to the lower conductive plate of the first capacitor and the upper conductive plate of the second capacitor. The conductive cup includes a second bore to receive a second inner conductor of the second coaxial cable. To maximize electrical contact, a diameter of the conductive cup is preferably greater than a combined height of the lower conductive plate of the first capacitor and the upper conductive plate of the second capacitor. Additionally, to prevent undesired shorting of the plates of one capacitor together, the diameter of the conductive cup should be less than a combined height of the first dielectric material, the lower conductive plate of the first capacitor, the upper conductive plate of the second capacitor and the second dielectric material.

In an embodiment of the present invention, to assure contact is maintained between the parallel plate capacitors and the first and second coaxial cables, one or both of the first inner conductor and the second inner conductor includes a central bore, within which an axial pressure contact member is inserted. A tapered end of the axial pressure contact member rests within the corresponding bore of the conductive clip and conductive cup (i.e., the first bore of the clip, or the second bore of the cup), and provides axial pressure to keep the capacitive structure firmly between the first and second inner conductors.

BRIEF DESCRIPTION OF THE DRAWINGS/FIGURES

Features of the present invention will become more apparent from the detailed description set forth below when taken in conjunction with the drawings in which like reference characters identify the same or similar elements throughout and wherein.

DETAILED DESCRIPTION OF THE INVENTION

Figure 1A:
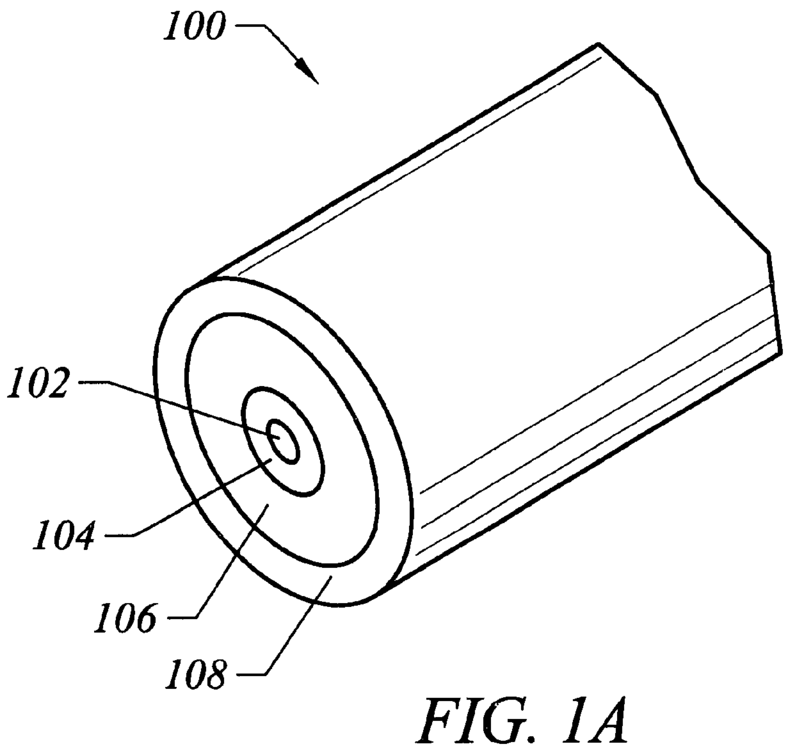
FIG. 1A illustrates a perspective view of a portion of an exemplary microwave coaxial transmission cable.
Figure 1B:
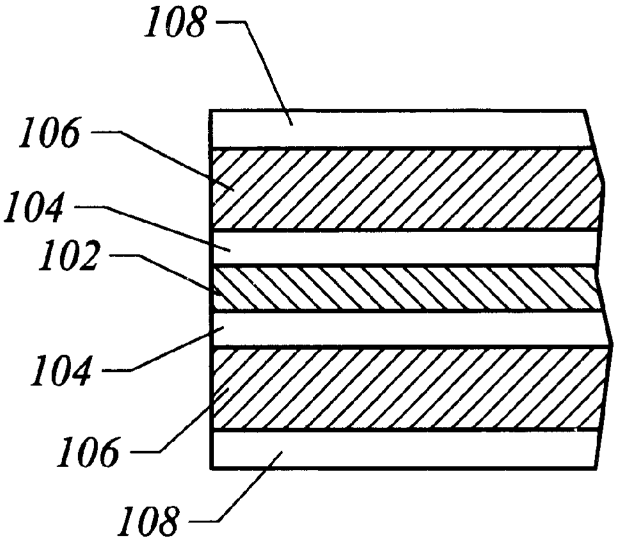
FIG. 1B illustrates a cutaway side view of the microwave coaxial transmission cable of FIG. 1A.
Figure 2A:
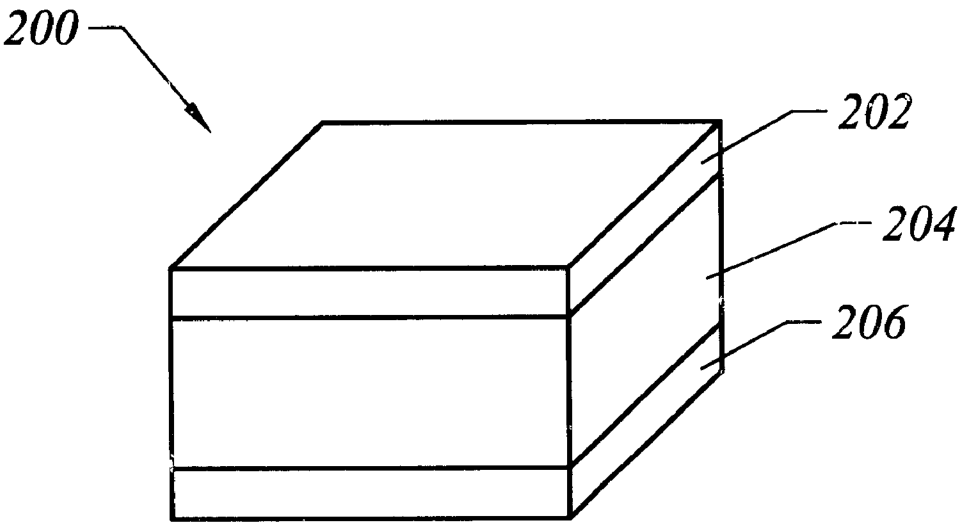
FIG. 2A illustrates a perspective view of an exemplary parallel plate capacitor.
Figure 2B:
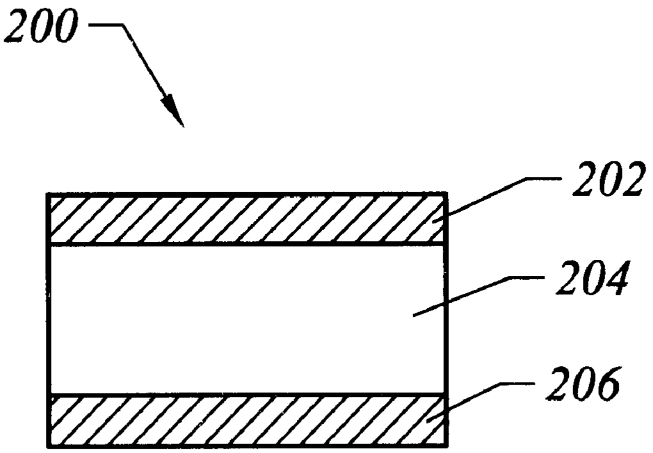
FIG. 2B illustrates a cutaway side view of the parallel plate capacitor of FIG. 2A.

One technique for blocking low frequencies in a microwave transmission line made up of one or more coaxial cables 100 is to place a direct current (DC) blocking parallel plate capacitor between inner conductors 102 of two coaxial cables 100. Such a capacitor is a device made up of two conducting surfaces separated by a dielectric insulating material. FIG. 2A shows a perspective view of an exemplary parallel plate capacitor 200, which is a common type of DC blocking capacitor. FIG. 2B shows a cutaway side view of parallel plate capacitor 200. As shown in FIGS. 2A and 2B, parallel plate capacitor 200 includes a pair of conductive plates 202 and 206, also referred to herein as an upper conductive plate 202 and a lower conductive plate 206. The terms upper and lower are used for naming convenience, as parallel plate capacitor 200 operates in the same manner turned upside down. Upper conductive plate 202 and lower conductive plate 206 are substantially parallel to an another. Additionally, the pair of plates 202 and 206 are separated from one another by a dielectric material 204.

Figure 3:
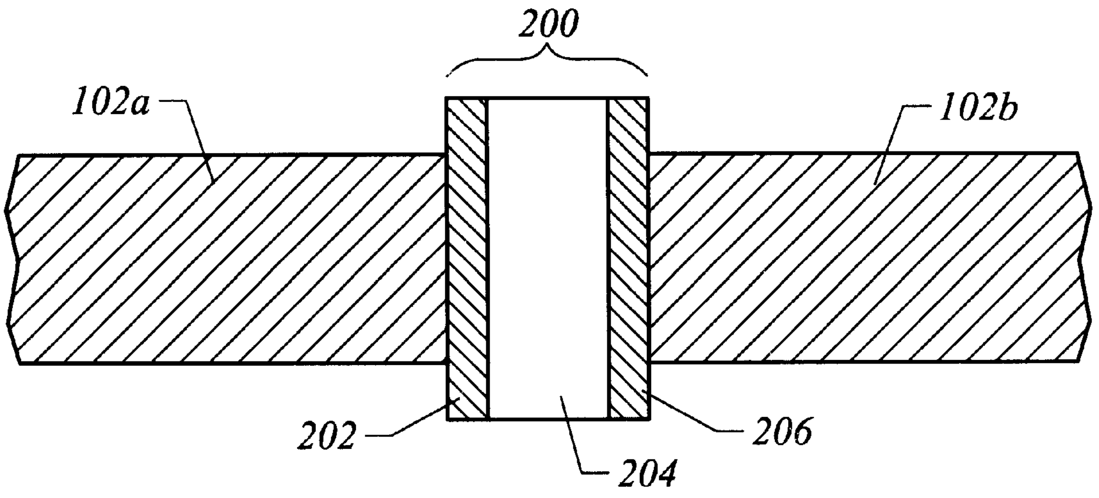
FIG. 3 illustrates a possible solution for placing a parallel plate capacitor between inner conductors of two coaxial transmission lines.

FIG. 3 illustrates one possible solution for placing parallel plate capacitor 200 between inner conductors of two coaxial transmission lines. As shown in FIG. 3, upper conductive plate 202 is in contact with a first inner conductor 102*a* (of a first coaxial transmission cable 100*a*). Similarly, lower conductive plate 206 is in contact with a second inner conductor 102*b* (of a second coaxial transmission cable 100*b*). For a transmission line including these components to operate correctly, upper conductive plate 202 must remain in contact with first inner conductor 102*a,* and lower conductive plate 206 must remain in contact with second inner conductor 102*b*. This can be accomplished by soldering first inner conductor 102*a* to upper conductive plate 202, and second inner conductor 102*b* to lower conductive plate 206. A problem with this solution is that once soldered in the manner suggested, capacitor 200 can not be easily removed and/or replaced. Additionally, the soldering of inner conductors 102*a* and 102*b* damages proximal ends of the inner conductors.

Another problem with trying to place a parallel plate capacitor between two inner conductors, in the manner shown in FIG. 3, is that the physical space available to produce such a connection may be limited, for example, by the space devoted to insulating layer 104 and/or the space devoted to, outer conductor 106.

Embodiments of the present invention, which are discussed in detail below, use multiple capacitors in a coaxial structure to lower the DC cutoff frequency, and thereby reduce signal loss at lower frequencies. Preferably, although not necessarily, the capacitors can be easily removed from and/or replaced within the coaxial structure.

Figure 4:
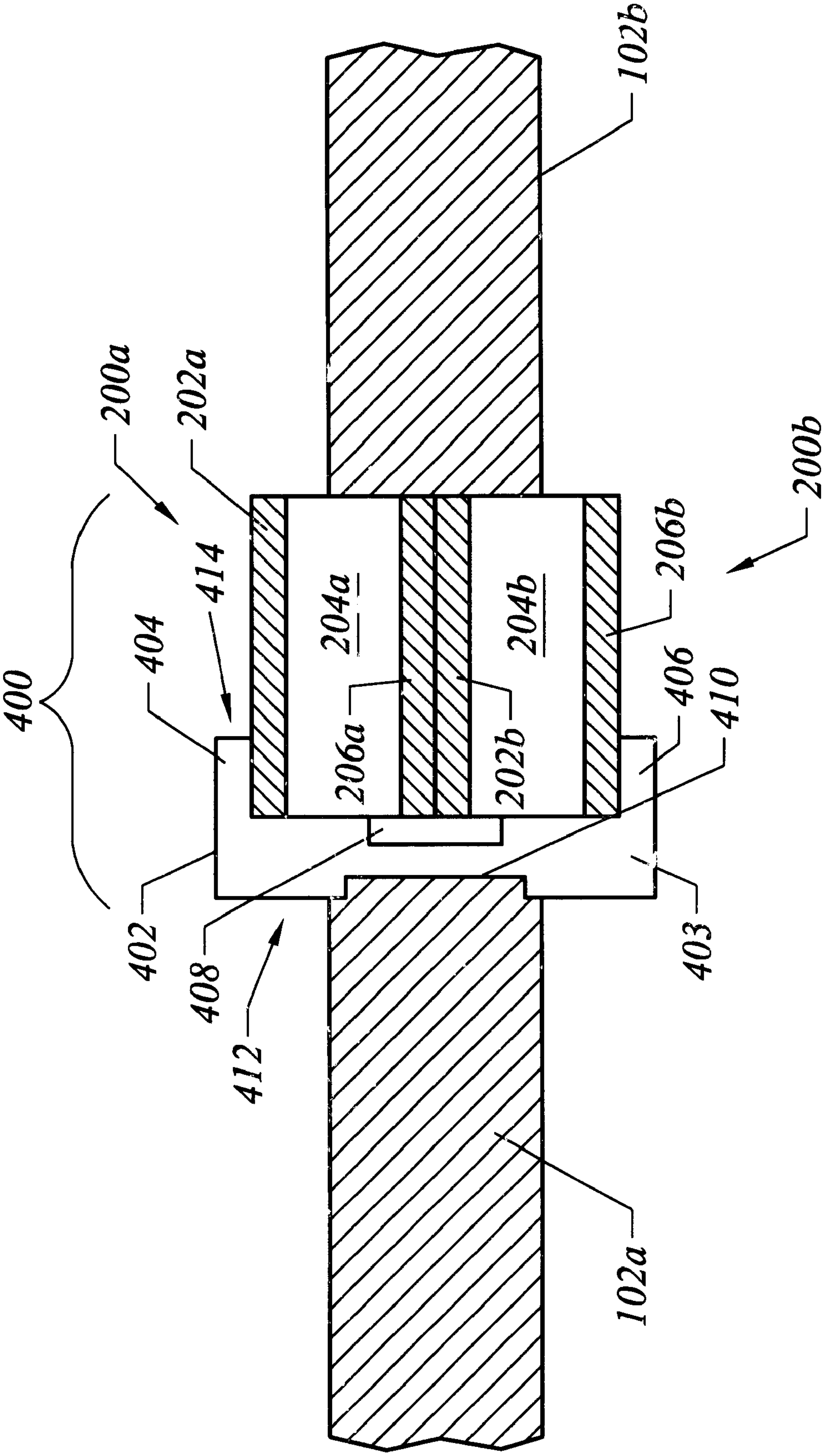
FIG. 4 illustrates a capacitive structure, according to an embodiment of the present invention.
Figure 5A:
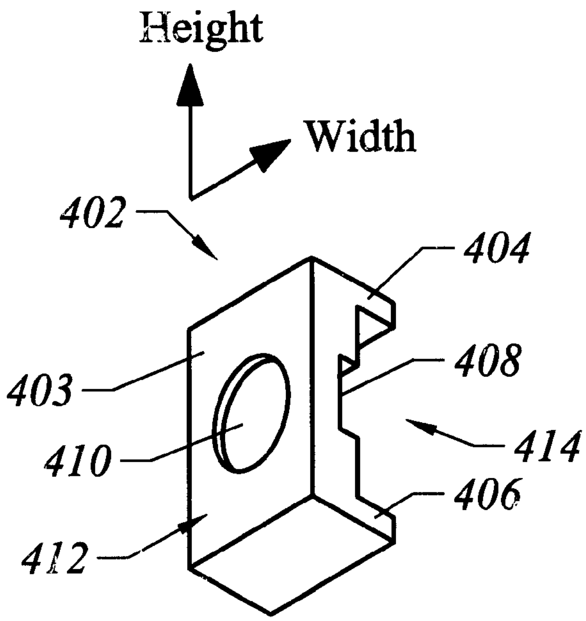
FIG. 5A illustrates a perspective view of a conductive clip of the capacitive structure of FIG. 4, according to an embodiment of the present invention.
Figure 5C:
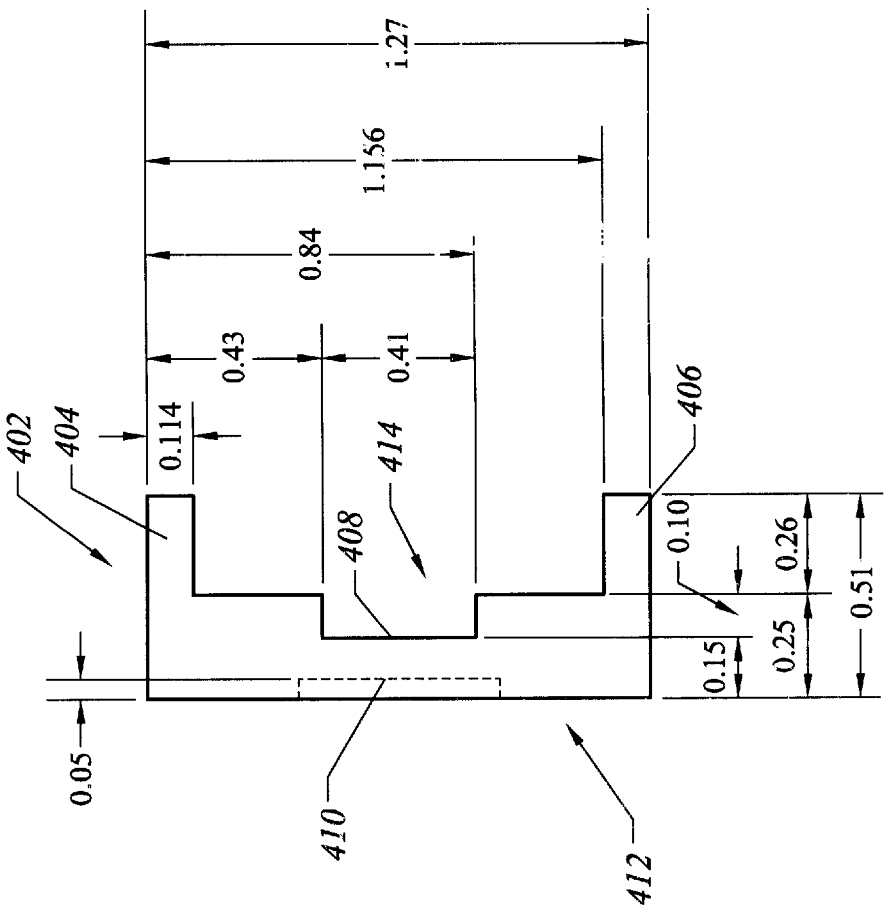
FIG. 5C illustrates a side view of the conductive clip of FIG. 5A.
Figure 5B:
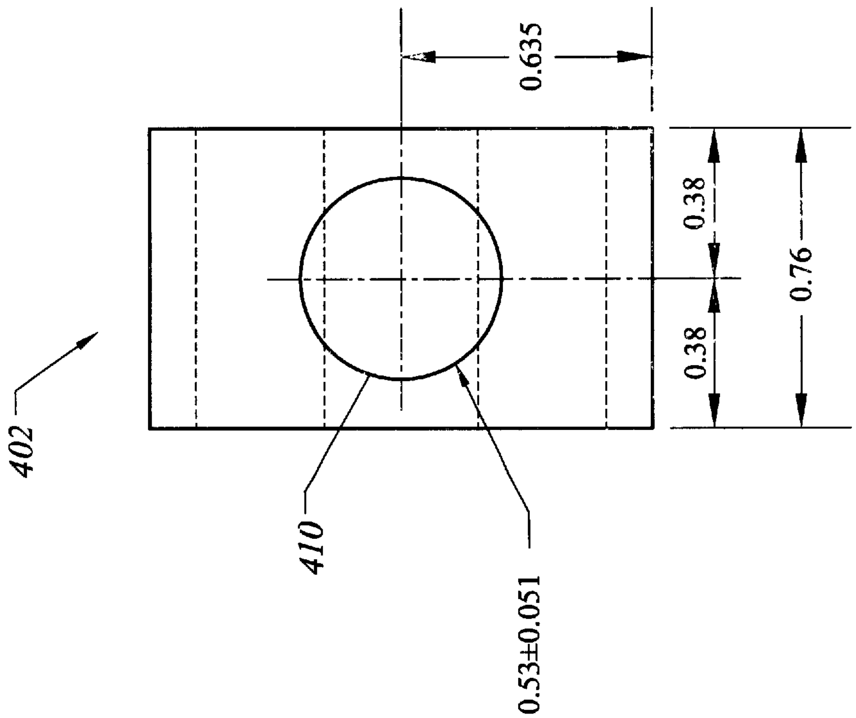
FIG. 5B illustrates a rear view of the conductive clip of FIG. 5A.

FIG. 4 illustrates a capacitive structure 400, according to an embodiment of the present invention. Capacitive structure 400 includes a pair of parallel plate capacitors (i.e., a first parallel plate capacitor 200*a* and a second parallel plate capacitor 200*b*) connected together back to back. More specifically, a lower conductive plate 206*a* of a first capacitor 200*a* is engaged against an upper conductive, plate 202*b* of a second capacitor 200*b*. In an embodiment of the present invention, plates 206*a* and 202*b* are soldered and/or wire bonded together (i.e., to one another) along their outer planer surfaces. A conductive clip 402 connects an upper conductive plate 202*a* of first capacitor 200*a* to a lower conductive plate 206*b* of the second capacitor 200*b*. An inner surface 414 of clip 402 includes a channel 408 that prevents conductive plates 202*a* and 206*b* (which are connected together by clip 402) from being shorted to plates 206*a* and 202*b* (which are connected together). Additional details of conductive clip 402 are shown in FIGS. 5A, 5B and 5C, which show, respectively, a perspective view, a rear view and a side view of conductive clip 402. Exemplary dimensions of conductive clip 402, according to an embodiment of the present invention, are shown in millimeters (mm) in these figures.

Referring to FIG. 4, and FIGS. 5A–5C, conductive clip 402 includes a rectangular body 403 having a substantially planer outer surface 412, and an inner surface 414 from which extend an upper lip 402 and a lower lip 406. Upper lip 402 and lower lip 406 form a cavity for accepting first capacitor 200*a* and second capacitor 200*b*. As shown in FIG. 4, an inner surface of upper lip 404 is engaged against (and preferably soldered and/or wire bonded to) an outer surface of upper conductive plate 202*a* (of first capacitor 200*a*). Similarly, an inner surface of lower lip 406 is engaged against (and preferably soldered and/or wire bonded to) an outer surface of lower conductive plate 206*b* (of second capacitor 200*b*). In this manner, upper conductive plate 202*a* (of first capacitor 200*a*) is connected to lower conductive plate 206*b* (of second capacitor 200*b*) through conductive clip 402, as mentioned above.

Inner surface 414 includes a channel 408 that preferably extends the width of body 403. Channel 408 prevents lower conductive plate 206*a* (of first capacitor 200*a*) and upper conductive plate 202*b* (of second capacitor 200*b*), which are engaged against one another, from being shorted to upper conductive plate 202*a* (of first capacitor 200*a*) and lower conductive plate 206*b* (of second capacitor 200*b*), as mentioned above. Accordingly, a height of channel 408 (e.g., 0.41 mm) is greater than the collective thickness of lower conductive plate 206*a* and upper conducive plate 202*b,* as shown in FIG. 4.

Outer surface 412 includes a circular bore 410 that extends into, but preferably not through, body 403. Bore 410 is for accepting a first inner conductor 102*a* of a first coaxial transmission cable. A proximal end of first inner conductor 102*a* may be machined down (i.e., reduced in diameter), if necessary, to fit into bore 410 of conductive clip 402. This is necessary if the diameter of inner conductor 102*a* is greater than the diameter of bore 410. Inner conductor 102*a* can be press fit into bore 410. Additionally, or alternatively, inner conductor 102*a* can be soldered and/or wire bonded into bore 410. However, soldering and/or wire bonding should only be used if there is no need to remove or replace capacitive structure 400. Similarly, a proximal end of inner conductor 102*b* is shown as being soldered and/or wire bonded to lower conductive plate 206*a* (of first capacitor 200*a*) and upper conductive plate 202*b* (of second capacitor 200*b*).

Figure 6:
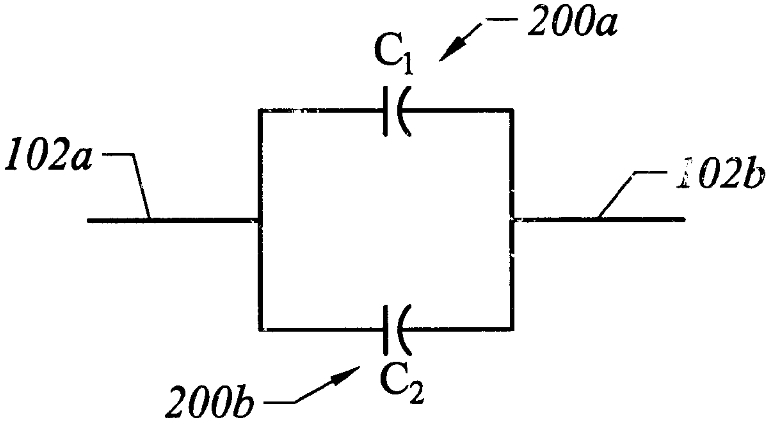
FIG. 6 illustrates a circuit diagram for the capacitive structure of FIG. 4.

FIG. 6 illustrates a circuit diagram for capacitive structure 400. As shown, capacitive structure 400 includes, in essence, a pair of capacitors $C_1$ and $C_2$ (200*a* and 200*b*) connected in parallel. As is well known, when capacitors are connected in parallel, the resulting capacitance is equal to the values of the capacitors added together. Thus, if capacitor 200*a* is a 0.1 μF capacitor, and capacitor 200*b* is also a 0.1 μF capacitor, then capacitive structure 400 has a capacitance of 0.2 μF. Tests have shown that the DC cutoff frequency is significantly lower when using a capacitive structure (as shown in FIG. 4) having a capacitance of 0.2 μF, as compared to using a single capacitor (as shown in FIG. 3) having a capacitance of 0.1 μF. More specifically, the DC cutoff frequency when using a 0.2 μF capacitance structures is at about 30 KHz, as compared to 90 KHz when using a 0.1 μF capacitance.

Figure 7:
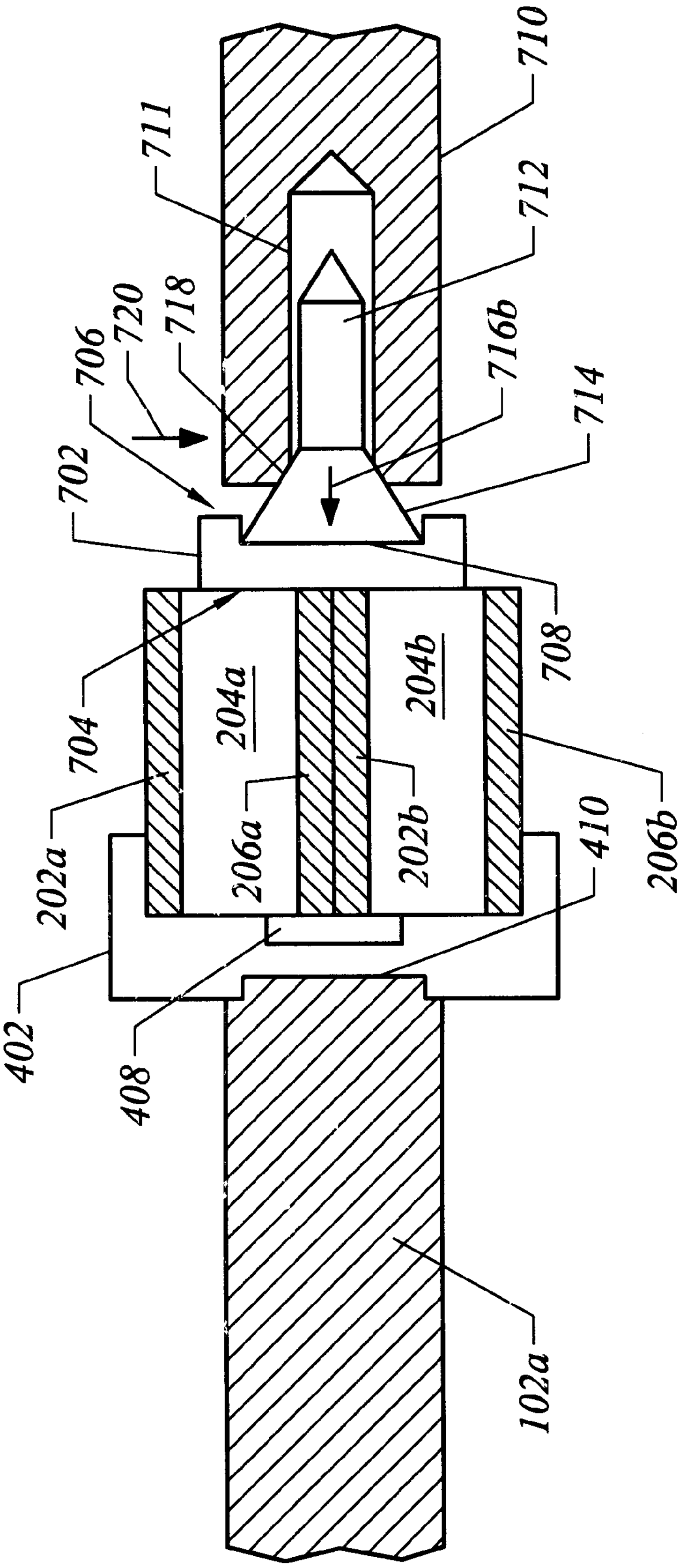
FIG. 7 illustrates a capacitive structure according to an alternative embodiment of the present invention.
Figure 8A:
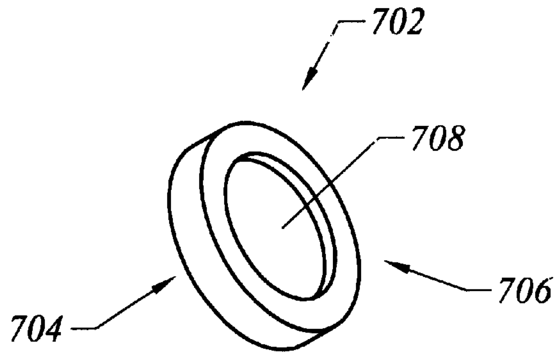
FIG. 8A illustrates a perspective view of a conductive cup of the capacitive structure of FIG. 7.
Figure 8B:
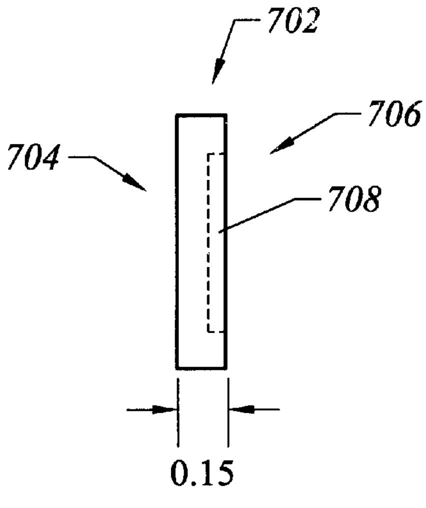
FIG. 8B illustrates a side view of the conductive cup of FIG. 8A.
Figure 8C:
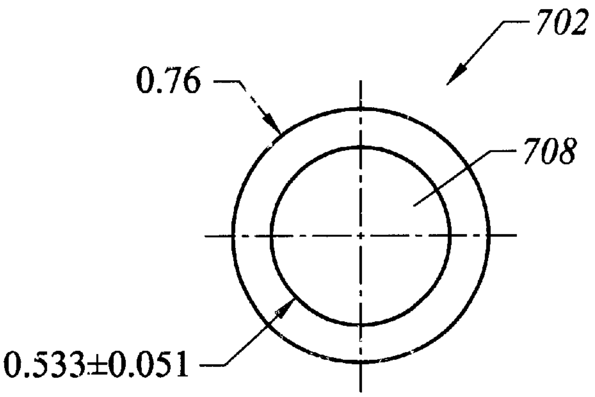
FIG. 8C illustrates a front view of the conductive cup of FIG. 8A.

An alternative embodiment of the present invention is shown in FIG. 7. In this embodiment, a conductive cup 702 is soldered and/or wire bonded to exposed ends of conductive plates 206*a* and 202*b,* as shown in FIG. 7. Additional details of conductive cup 702 are shown in FIGS. 8A, 8B and 8C, which show, respectively, a perspective view, a side view, and a front view of conductive cup 702. Exemplary dimensions of conductive cup 702, according to an embodiment of the present invention, are shown in millimeters (mm) in these figures. As shown in FIGS. 8A and 8C, conductive cup 702, is preferably (but not necessarily) substantially circular. An outer surface 704 of conductive cup 702 is substantially planer. An inner surface 706 of conductive cup 702 includes a substantially circular bore 708 that extends into, but preferably not through, cup 702. Referring to FIG. 7, outer surface 704 of conductive cup 702 is soldered and/or wire bonded to ends of conductive plates 206*a* and 202*b,* as mentioned above.

A diameter of conductive cup 702 (e.g., 0.76 mm) is preferably greater than a combined height of lower conductive plate 206*a* (of first capacitor 200*a*) and upper conductive plate 202*b* (of second capacitor 200*b*). Additionally, to prevent conductive cup 702 from contacting upper conductive plate 202*a* (of first capacitor 200*a*) and lower conductive plate 206*b* (of second capacitor 200*b*), the diameter of conductive cup 702 (e.g., 0.76 mm) should be less than a combined height of first dielectric material 204*a,* lower conductive plate 206*a,* upper conductive plate 202*b* and second dielectric material 204*b,* as shown in FIG. 7.

An alternative type of inner conductor 710 (e.g., of a coaxial cable) includes a central bore 711, within which a cylindrical axial pressure contact member 712 is inserted. Cylindrical axial pressure contact member 712 has a tapered end contact 714 that rests within bore 708 of conductive cup 702. Cylindrical axial pressure contact member 712 provides an axial pressure in the direction of arrow 716, as will be described below. In an embodiment of the present invention, inner conductor 710 is of the type disclosed in detail in U.S. Pat. No. 5,576,675, entitled "Microwave Connector With An Inner Conductor That Provides An Axially Resilient Coaxial Connector," which is incorporated herein by reference in its entirety. As shown in FIG. 7, tapered end contact 714 rests partially within bore 708 of conductive cup 702 and partially within central bore 711 of inner conductor 710. As tapered end contact 714 makes contact with an inner surface of central bore 711, radial pressure is provided in a direction 720 towards the center of bore 711. The radial pressure, in turn, produces an axial pressure in a direction 716. In this manner, inner conductor 710 (and more specifically, contact member 712) provides an axial pressure in direction 716 against conductive cup 702. Due to the axial pressure, end contact 714 (and thus, inner conductor 710) remains in contact with conductive cup 702 (and thus, conductive plates 206*a* and 202*b*). Bore 708 prevents tapered end contact 714 from slipping or sliding in a direction perpendicular to axial arrow 716. Additionally, the axial pressure provided by cylindrical axial pressure contact member 712 also produces axial pressure between proximal end of inner conductor 102*a* and bore 410 of conductive clip 402. This enables that the end of inner conductor 102*a* to rest securely within bore 410 of clip 402, even if inner conductor 102*a* is not soldered or wire bonded to bore 410.

Figure 9:
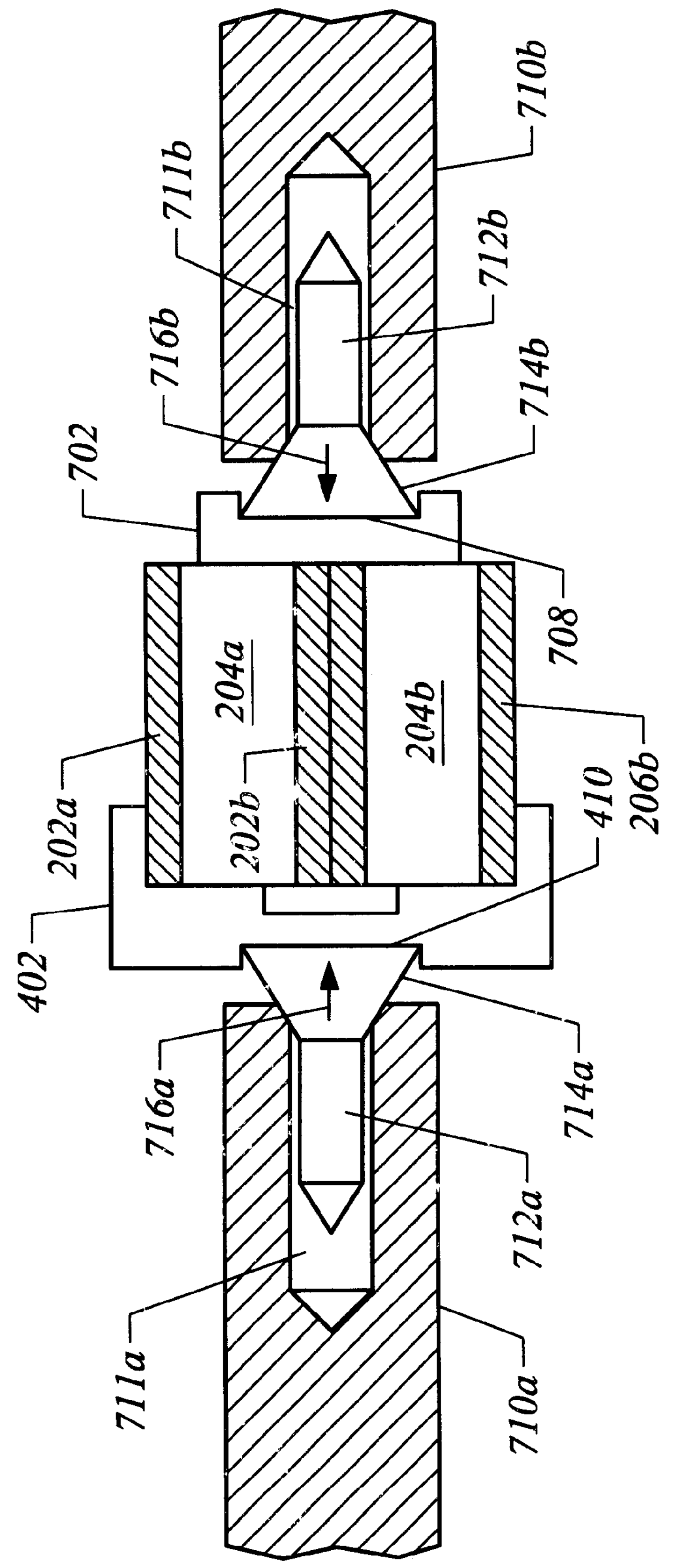
FIG. 9 illustrates the capacitive structure of FIG. 7 connected between two axial resilient inner conductors of two coaxial transmission cables, according to an embodiment of the present invention.

Another embodiment of the present invention is shown in FIG. 9. This embodiment is similar to the embodiment discussed with reference to FIG. 7, except both a first inner conductor 710*a* and second inner conductor 710*b* include respective central bores 711*a* and 711*b,* within which respective cylindrical axial pressure contact member 712*a* and 712*b* are inserted. Cylindrical pressure contact member 712*a* provides axial pressure in a direction 716*a.* This causes a tapered end contact 714*a* of cylindrical contact member 712*a* to rest securely within bore 410 of clip 402 without soldering or wire bonding. Similarly, cylindrical pressure contact member 712*b* provides axial pressure in a direction 716*b,* which is opposite direction 716*a.* This causes a tapered end contact 714*b* of cylindrical contact member 712*b* to rest securely within bore 708 of cup 702 without soldering or wire bonding. Accordingly, with this embodiment the capacitive structure of the present invention can be removed and/or replaced without dealing with solder or wire bonds.

The previous description of the preferred embodiments of the present invention has been provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

It is noted that the terms "first" and "second" have often been used herein to differentiate elements. However, a first element and a second element may be substantially similar. For example, first dielectric material 204*a* and second dielectric material 204*b* may be made of substantially similar materials. For another example, first capacitor 200*a* may be substantially similar to second capacitor 200*b.*

What is claimed is:

1. A capacitive structure, comprising:

a first capacitor including an upper conductive plate and a lower conductive plate that are substantially parallel to one another and separated from one another by a first dielectric material;

a second capacitor including an upper conductive plate and lower conductive plate that are substantially parallel to one another and separated by a second dielectric material, wherein the lower conductive plate of the first capacitor is engaged against, and thereby connected to, the upper conductive plate of the second capacitor; and a conductive clip that connects the upper conductive plate of the first capacitor to the lower conductive plate of the second capacitor.

2. The structure of claim 1, wherein the conductive clip comprises a body having an outer surface and an inner surface, the inner surface including a channel that prevents the lower conductive plate of the first capacitor and the upper conductive plate of the second capacitor from shorting with the upper conductive plate of the first capacitor and the lower conductive plate of the second capacitor.

3. The structure of claim 2, wherein the channel extends a width of the body.

4. The structure of claim 3, wherein a height of the channel is greater than a combined height of the lower conductive plate of the first capacitor and the upper conductive plate of the second capacitor.

5. The structure of claim 2, wherein the outer surface comprises a first bore to receive a first inner conductor of a first coaxial cable.

6. The structure of claim 5, further comprising a conductive cup that is connected to the lower conductive plate of the first capacitor and the upper conductive plate of the second capacitor, the conductive cup including a second bore to receive a second inner conductor of a second coaxial cable.

7. The structure of claim 6, wherein the conductive cup is substantially circular.

8. The structure of claim 7, wherein a diameter of the conductive cup is greater than a combined height of the lower conductive plate. of the first capacitor and the upper conductive plate of the second capacitor.

9. The structure of claim 8, wherein the diameter of the conductive cup is less than a combined height of the first dielectric material, the lower conductive plate of the first capacitor, the upper conductive plate of the second capacitor and the second dielectric material.

10. The structure of claim 2, further comprising:

a first inner conductor of a first coaxial cable engaged against the outer surface of the body of the conductive clip; and a second inner conductor of a second coaxial cable engaged against an edge of the lower conductive plate of the first capacitor and an edge of the upper conductive plate of the second capacitor.

11. The structure of claim 10, wherein the second inner conductor includes:

a central bore; and an axial pressure contact member inserted within the central bore, wherein a tapered end of the axial pressure contact member rests against the edge of the lower conductive plate of the first capacitor and the edge of the upper conductive plate of the second capacitor.

12. The structure of claim 10, wherein the first inner conductor includes:

a central bore; and an axial pressure contact member inserted within the central bore, wherein a tapered end of the axial pressure contact member rests against the outer surface of the body of the conductive clip.

13. The structure of claim 10, wherein:

the first inner conductor includes a first contact member that provides a first axial pressure in a direction toward the outer surface of the body of the conductive clip; and the second inner conductor includes a second contact member that provides a second axial pressure in a direction toward the edge of the lower conductive plate of the first capacitor and the edge of the upper conductive plate of the second capacitor, the second axial pressure being opposite the first axial pressure.

14. The structure of claim 1, wherein the conductive clip includes an inner surface from which extend a first lip and a second lip, the first lip engaging against an outer surface of the upper conductive plate of the first capacitor, the second lip engaging against an outer surface of the lower conductive plate of the second capacitor.

15. A capacitive structure, comprising:

a first parallel plate capacitor including a first pair of conductive plates;

a second parallel plate capacitor including a second pair of conductive plates; and a conductive clip, wherein the first parallel plate capacitor and the second parallel plate are arranged one on top of another such that a first conductive plate of the first pair of conductive plates is engaged against a first conductive plate of the second pair of conductive plates, and wherein the conductive clip connects a second conductive plate of the first pair of conductive plates to a second conductive plate of the second pair of conductive plates, without contacting either of the first conductive plate of the first pair of conductive plates or the first conductive plate of the second pair of conductive plates.

16. A conductive clip that is useful for connecting first and second of parallel plate capacitors in parallel, the conductive clip comprising:

a body including an inner surface and an outer surface;

a pair of lips that extend from opposite ends of the inner surface to thereby form a cavity for accepting the first and second parallel plate capacitors arranged back to back, the pair of lips useful for connecting an upper conductive plate of the first capacitor to a lower conductive plate of the second capacitor; and a channel extending a width of the inner surface, the channel ensuring that a lower conductive plate of the first capacitor and an upper conductive plate of the second capacitor do not short with the upper conductive plate of the first capacitor and the lower conductive plate of the second capacitor.

17. The conductive clip of claim 16, wherein a height of the channel is greater than a combined height of the lower conductive plate of the first capacitor and the upper conductive plate of the second capacitor.

18. The conductive clip of claim 16, wherein the outer surface of the body includes a bore the extends into, but not through, the body, the bore useful for accepting an inner conductor of a coaxial transmission cable.

19. The conductive clip of claim 18, wherein the bore is substantially circular.

20. The conducive clip of claim 16, wherein the body of the clip is substantially rectangular.

21. A structure, comprising:

a first capacitor including an upper conductive plate and a lower conductive plate that are substantially parallel to one another and separated from one another by a first dielectric material;

a second capacitor including an upper conductive plate and lower conductive plate that are substantially parallel to one another and separated by a second dielectric material, wherein the lower conductive plate of the first capacitor is engaged against, and thereby connected to, the upper conductive plate of the second capacitor;

a conductive clip that connects the upper conductive plate of the first capacitor to the lower conductive plate of the second capacitor, wherein the conductive clip comprises a body having an outer surface and an inner surface, wherein the inner surface includes a channel that prevents the lower conductive plate of the first capacitor and the upper conductive plate of the second capacitor from shorting with the upper conductive plate of the first capacitor and the lower conductive plate of the second capacitor, and wherein the outer surface includes a first bore that extends into the body; and a conductive cup that is connected to the lower conductive plate of the first capacitor and the upper conductive plate of the second capacitor, the conductive cup including a second bore.

22. The structure of claim 21, further comprising:

a first inner conductor of a first coaxial cable resting within the first bore; and a second inner conductor of a second coaxial cable resting with the second bore.

23. The structure of claim 22, wherein the second inner conductor includes:

a central bore; and an axial pressure contact member inserted within the central bore, wherein a tapered end of the axial pressure contact member rests within the second bore of the conductive cup.

24. The structure of claim 22, wherein the first inner conductor includes:

a central bore; and an axial pressure contact member inserted within the central bore, wherein a tapered end of the axial pressure contact member rests with the first bore of the conductive clip.

25. The structure of claim 22, wherein:

the first inner conductor includes a first contact member that provides a first axial pressure in a direction toward the first bore; and the second inner conductor includes a second contact member that provides a second axial pressure in a direction toward the second bore, the second axial pressure being opposite the first axial pressure.

* * * * *

UNITED STATES PATENT AND TRADEMARK OFFICE

CERTIFICATE OF CORRECTION

PATENT NO. : 6,496,353 B1

DATED : December 17, 2002

INVENTOR(S) : Vincent Chio

It is certified that error appears in the above-identified patent and that said Letters Patent is hereby corrected as shown below:

<u>Column 7,</u>
Line 18, replace "plate.of" with -- plate of --.

<u>Column 8,</u>
Line 40, replace "bore the extends" with -- bore that extends --.

Signed and Sealed this

Eleventh Day of March, 2003

JAMES E. ROGAN

*Director of the United States Patent and Trademark Office*